(12) United States Patent
Takamatsu

(10) Patent No.: US 11,554,929 B2
(45) Date of Patent: Jan. 17, 2023

(54) TRANSPORT APPARATUS

(71) Applicant: SEIKO EPSON CORPORATION, Tokyo (JP)

(72) Inventor: Seiji Takamatsu, Kitakyushu (JP)

(73) Assignee: Seiko Epson Corporation, Tokyo (JP)

( * ) Notice: Subject to any disclaimer, the term of this patent is extended or adjusted under 35 U.S.C. 154(b) by 239 days.

(21) Appl. No.: 16/939,628

(22) Filed: Jul. 27, 2020

(65) Prior Publication Data

US 2021/0032057 A1 Feb. 4, 2021

(30) Foreign Application Priority Data

Jul. 30, 2019 (JP) .............................. JP2019-139500

(51) Int. Cl.
*B65H 7/12* (2006.01)

(52) U.S. Cl.
CPC ......... *B65H 7/125* (2013.01); *B65H 2553/30* (2013.01)

(58) Field of Classification Search
CPC ...... B65H 7/125; B65H 7/12; B65H 2553/30; B65H 2557/61; B65H 2511/13; B65H 2511/524
See application file for complete search history.

(56) References Cited

U.S. PATENT DOCUMENTS 9,733,218 B2\* 8/2017 Ono ................... G01N 29/4427
2019/0062091 A1\* 2/2019 Nishizaka .............. B65H 7/125

FOREIGN PATENT DOCUMENTS

JP 2012188177 A \* 10/2012
JP 2017-109858 A 6/2017
JP 2019-123580 A 7/2019

\* cited by examiner

*Primary Examiner* — Luis A Gonzalez
(74) *Attorney, Agent, or Firm* — Workman Nydegger

(57) ABSTRACT

A transport apparatus includes a speaker and a mike disposed at respective positions between which a transport path of a medium is interposed, where the speaker and the mike face each other, a drive circuit that outputs a drive signal to the speaker, an amplifier circuit formed by coupling a plurality of amplifiers in series, where the amplifier circuit amplifies and outputs an output signal of the mike, a processor to which the output signal of the amplifier circuit is input, an attenuation circuit disposed in a stage preceding a predetermined amplifier, where the attenuation circuit attenuates an input signal and outputs the input signal to the predetermined amplifier, and a switch that switches an attenuation factor by the attenuation circuit.

4 Claims, 6 Drawing Sheets

TRANSPORT APPARATUS

The present application is based on, and claims priority from JP Application Serial Number 2019-139500, filed Jul. 30, 2019, the disclosure of which is hereby incorporated by reference herein in its entirety.

BACKGROUND

1. Technical Field

The present disclosure relates to a transport apparatus that transports a medium.

2. Related Art

A transport apparatus is used in a scanner that reads a document as a medium, a printer that performs printing on a sheet as a medium, or the like. When a plurality of document sheets to be read is stacked, the transport apparatus of the scanner draws the document sheets one by one into the transport path to transport the document sheets. In rare cases, the transport apparatus may transport a plurality of overlapped document sheets. Transporting a single medium is referred to as single feed, and transporting a plurality of overlapped mediums is referred to as multi feed.

The process of detecting whether the multi feed or the single feed is performed is referred to as a multi feed detection process. In order to perform the multi feed detection process, a speaker that emits ultrasonic waves and a microphone that receives the ultrasonic waves are disposed at respective positions between which the transport path of the medium is interposed with the speaker and the microphone facing each other. The microphone is abbreviated as a mike. The speaker outputs an ultrasonic wave having a predetermined volume, and the mike receives the ultrasonic wave and outputs a signal corresponding to the volume. The output signal of the mike when the multi feed is performed is smaller than that when the single feed is performed.

The output signal of the mike is input to an amplifier circuit and output from the amplifier circuit after amplified by the amplifier circuit. A configuration is disclosed in which an ultrasonic sensor corresponding to a mike is provided, and an output of the ultrasonic sensor is converted into a digital value by an analog/digital (A/D) converter after passing through a pre-stage amplifier, a filter, and a post-stage amplifier (see JP-A-2017-109858). A CPU receives the digital value converted as described above, and compares the digital value with a predetermined threshold value to perform the multi feed detection process.

The output of an ultrasonic sensor is affected by conditions such as sensor sensitivity and atmospheric pressure, and the environment. Due to such a difference in environment and the like, the digital value based on the output signal of the ultrasonic sensor may fluctuate, so that it may not be possible to accurately detect whether feed is multi feed or single feed when compared the digital value with the predetermined threshold value. In order to prevent a decrease in the accuracy of the multi feed detection process due to the difference in environment and the like, calibration for adjusting the configuration for the multi feed detection process to an appropriate state is performed in advance when using the transport apparatus.

However, in the related art, the circuit configuration required for calibration has been complicated. As a result, the cost of the product including the transport apparatus and the man-hour in manufacturing the product have increased.

SUMMARY

A transport apparatus includes a transport mechanism for transporting a medium along a predetermined transport path, a speaker and a mike disposed at respective positions between which the transport path is interposed, where the speaker and the mike faces each other, a drive circuit that outputs a drive signal to the speaker, an amplifier circuit formed by coupling a plurality of amplifiers in series, where the amplifier circuit amplifies and outputs an output signal of the mike, a processor to which the output signal of the amplifier circuit is input, an attenuation circuit disposed in a stage preceding a predetermined amplifier of the plurality of amplifiers, where the attenuation circuit attenuates an input signal to output the attenuated input signal to the predetermined amplifier, and a switch that switches an attenuation factor by the attenuation circuit. The processor causes the switch to switch the attenuation factor by the attenuation circuit to a first attenuation factor among the first attenuation factor and a second attenuation factor having a lower attenuation degree than the first attenuation factor in a state where the medium is not present between the speaker and the mike to adjust a drive signal of the drive circuit to the speaker based on the output signal of the amplifier circuit, and after adjusting the drive signal, causes the switch to switch the attenuation factor by the attenuation circuit to the second attenuation factor to determine a state between the mike and the speaker based on the output signal of the amplifier circuit.

DESCRIPTION OF EXEMPLARY EMBODIMENTS

Hereinafter, embodiments of the present disclosure will be described with reference to the drawings. The drawings are only an example for describing the embodiments. Since the drawings are an example, the ratio or shape may not be accurate, or they may not be in agreement with each other or may be partially omitted.

1. Device Configuration

Figure 1:
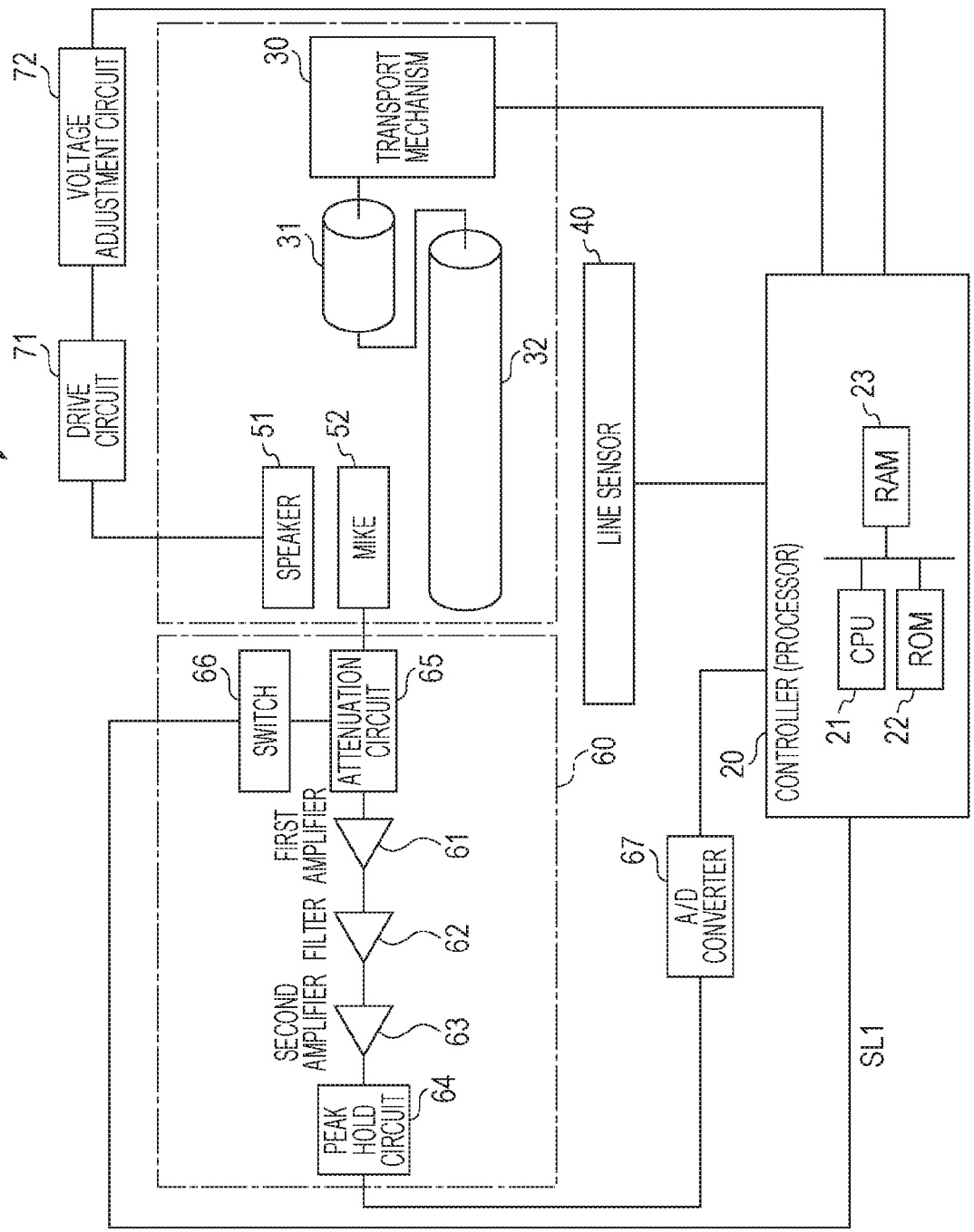
FIG. 1 is a block diagram showing a schematic configuration of a scanner.

FIG. 1 is a block diagram showing a schematic configuration of a scanner 10 to which the present embodiment is applied. The scanner 10 includes a controller 20 corresponding to a processor. The controller 20 includes an IC having a CPU 21, a ROM 22, and a RAM 23, and another nonvolatile memory. In the controller 20, the CPU 21 executes an arithmetic process according to a program stored in the ROM 22, the another nonvolatile memory, or the like using the RAM 23 as a work area to control respective units of the scanner 10. The processor is not limited to one CPU. A configuration in which processing is performed by a plurality of CPUs or a hardware circuit such as an application specific integrated circuit (ASIC), or a configuration in which the CPU and the hardware circuit cooperate with each other to perform processing may be employed.

The scanner 10 includes a transport mechanism 30 and a line sensor 40. The transport mechanism 30 includes one or a plurality of motors 31, one or a plurality of rollers 32 rotated by the power of the motors 31, and a transport path serving as a path through which a medium passes. The roller 32 constitutes part of the transport path. When the motor 31 is driven according to a control signal from the controller 20, the roller 32 starts rotating. The transport mechanism 30 takes a top or bottom sheet among a plurality of document sheets, which is overlapped mediums placed on the stacker, passes it through the transport path, and transports it to the discharge stacker. The scanner 10 is a transport apparatus having a medium reading function. The transport apparatus may be a printer having a function of performing printing on a medium. Of course, a multifunction machine that functions as a scanner and a printer may be referred to as the transport apparatus.

When the controller 20 controls the transport mechanism 30 to transport the medium along the transport path, the line sensor 40 disposed so that the longitudinal direction thereof intersects the transport path outputs a read signal corresponding to the brightness or color of the medium being transported to the controller 20. The controller 20 generates image data based on a read signal for the medium by the line sensor 40, and outputs the image data or output data obtained by converting the format of the image data to an external computer or the like (not shown).

A speaker 51 and a mike 52, which face each other, are disposed at respective positions between which the transport path is interposed. The speaker 51 and the mike 52 are disposed at respective positions upstream of the line sensor 40 in the transport path. When the drive signal is input, the speaker 51 outputs an ultrasonic wave toward the mike 52. The mike 52 outputs a signal corresponding to the volume of the input ultrasonic wave. The mike 52 is synonymous with an ultrasonic sensor.

The output terminal of the mike 52 is coupled to the input terminal of an amplifier circuit 60, and the output terminal of the amplifier circuit 60 is coupled to the input terminal of an A/D converter 67. The output terminal of the A/D converter 67 is coupled to one of the input ports of the controller 20. When the A/D converter 67 is regarded as part of the controller 20, the output terminal of the amplifier circuit 60 is coupled to the controller 20.

The amplifier circuit 60 includes a first amplifier 61 to which the output signal of the mike 52 is input. The output terminal of the first amplifier 61 is coupled to the input terminal of a filter 62, and the output terminal of the filter 62 is coupled to the input terminal of a second amplifier 63. Further, the output terminal of the second amplifier 63 is coupled to the input terminal of a peak hold circuit 64, and the output terminal of the peak hold circuit 64 is coupled to the input terminal of the A/D converter 67. That is, in the example of FIG. 1, the output terminal of the peak hold circuit 64 is the output terminal of the amplifier circuit 60.

As described above, the amplifier circuit 60 includes the first amplifier 61, the filter 62, the second amplifier 63, and the peak hold circuit 64. The amplifier circuit 60 is formed by coupling a plurality of amplifiers such as the first amplifier 61, the filter 62, and the second amplifier 63 in series. The amplification factor of the first amplifier 61 is, for example, 40 dB, the amplification factor of the filter 62 is, for example, 38 dB, and the amplification factor of the second amplifier 63 is, for example, 10 dB. These amplification factors are fixed values in this embodiment. Therefore, the man-hour for adjusting the amplification factors are not required.

The first amplifier 61 amplifies the output signal of the mike 52 to output the amplified output signal, and the second amplifier 63 amplifies the output signal of the filter 62 to output the amplified output signal. The filter 62 is a bandpass filter having a predetermined frequency as a center frequency. The filter 62 suppresses a frequency component other than that of the specific band including the center frequency of the output signal of the first amplifier 61, and outputs the signal. The peak hold circuit 64 holds the maximum value or a value close to the maximum value of the analog signal output from the second amplifier 63 to output the signal.

In this embodiment, an attenuation circuit 65 that attenuates the input signal to output the attenuated signal to the first amplifier 61, which is a post-stage amplifier, is disposed in a stage preceding the first amplifier 61, which is the first-stage amplifier included in the amplifier circuit 60. Further, a switch 66 that turns on/off the attenuation function of the attenuation circuit 65 is disposed. The attenuation circuit 65 and the switch 66 may be regarded as part of the amplifier circuit 60.

When the attenuation function is in the ON state, the attenuation circuit 65 receives the output signal of the mike 52, attenuates the output signal, and outputs the attenuated signal to the first amplifier 61. The attenuation factor of the input signal by the attenuation circuit 65 whose attenuation function is in the ON state is referred to as a first attenuation factor. The attenuation circuit 65 outputs a signal obtained by multiplying the amplitude of the input signal by the attenuation factor. On the other hand, the attenuation factor of the input signal by the attenuation circuit 65 whose attenuation function is in the OFF state is referred to as a second attenuation factor. The attenuation degree of the second attenuation factor is naturally lower than that of the first attenuation factor. The switch 66 can be said to be means for switching the attenuation factor of the attenuation circuit 65.

The second attenuation factor is a magnification of 1. That is, the attenuation circuit 65 whose attenuation function is in the OFF state passes the input signal to the post-stage without attenuating the input signal. However, the attenuation circuit 65 may be a circuit that attenuates the input signal even when the attenuation function is in the OFF state, although the attenuation degree when the attenuation function is in the OFF state is not as high as that when the attenuation function is in the ON state. For example, when the first attenuation factor is a magnification of ¹/₁₀, the second attenuation factor may be a magnification of ⁹/₁₀.

The attenuation circuit 65 includes, for example, a resistance voltage dividing circuit that voltage-divides the input signal by a plurality of resistors. Further, the switch 66 is configured by a field effect transistor (FET) or a bipolar transistor that performs a switchover for enabling/disabling the voltage-division by such a voltage dividing circuit. The controller 20 and the switch 66 are coupled through a control signal line SL1. The controller 20 transmits a predetermined switch control signal to the switch 66 via the control signal line SL1 to turn on the switch 66, thereby enabling the voltage-division by the above-mentioned voltage dividing circuit, that is, setting the attenuation function of the attenuation circuit 65 in the ON state. The controller 20 stops transmission of the switch control signal to turn off the switch 66, thereby disabling the voltage-division by the voltage dividing circuit, that is, setting the attenuation function of the attenuation circuit 65 in the OFF state.

A drive circuit 71 outputs a drive signal to be supplied to the speaker 51. That is, the drive circuit 71 outputs the drive signal to the speaker 51. The drive circuit 71 is an oscillation circuit that outputs an AC signal having an ultrasonic frequency so that the speaker 51 outputs an ultrasonic wave. A voltage adjustment circuit 72 is controlled by the controller 20 to supply a drive voltage to the drive circuit 71. The magnitude of the drive signal output by the drive circuit 71 is substantially proportional to the drive voltage by the voltage adjustment circuit 72. The volume of the ultrasonic wave generated by the speaker 51 is also substantially proportional to the drive voltage. The output of the mike 52 is also proportional to the volume of the ultrasonic wave generated by the speaker 51. Therefore, the output of the mike 52 can be adjusted by the controller 20 adjusting the drive voltage supplied by the voltage adjustment circuit 72.

The voltage adjustment circuit 72 is a circuit that selects and outputs any one of a plurality of different voltages, and outputs, according to an instruction from the controller 20, either a first drive voltage or a second drive voltage higher than the first drive voltage to the drive circuit 71. The first drive voltage is, for example, 12 V, and the second drive voltage is, for example, 20 V.

2. Calibration

The calibration is performed in a state before the use of the transport apparatus, that is, in a state where no medium is present in the transport path. The output signal of the amplifier circuit 60 when no medium is present in the transport path is greater than the output signal of the amplifier circuit 60 when the medium is present in the transport path, that is, when the medium is present between the speaker 51 and the mike 52. In light of the original function of the amplifier circuit 60 that amplifies the output signal of the mike 52 to output the amplified output signal for the controller 20 that performs the multi feed detection process, the output signal of the amplifier circuit 60 almost reaches the maximum value and is saturated when no medium is present in the transport path, so that the output signal cannot be expected as a value that accurately reflects the current environment in which the speaker 51 and the mike 52 are mounted.

Therefore, in order to perform an appropriate calibration, it is necessary to use the output signal, of the amplifier circuit 60, which is not saturated. Based on such a viewpoint, in the present embodiment, the attenuation circuit 65 and the switch 66 are added to the amplifier circuit 60. That is, the output signal of the mike 52 is attenuated by turning on the attenuation function of the attenuation circuit 65 by the switch 66, so that an appropriate value reflecting the current environment in which the speaker 51 and the mike 52 are mounted is obtained as the output signal of the amplifier circuit 60 even when no medium is present in the transport path.

Figure 2:
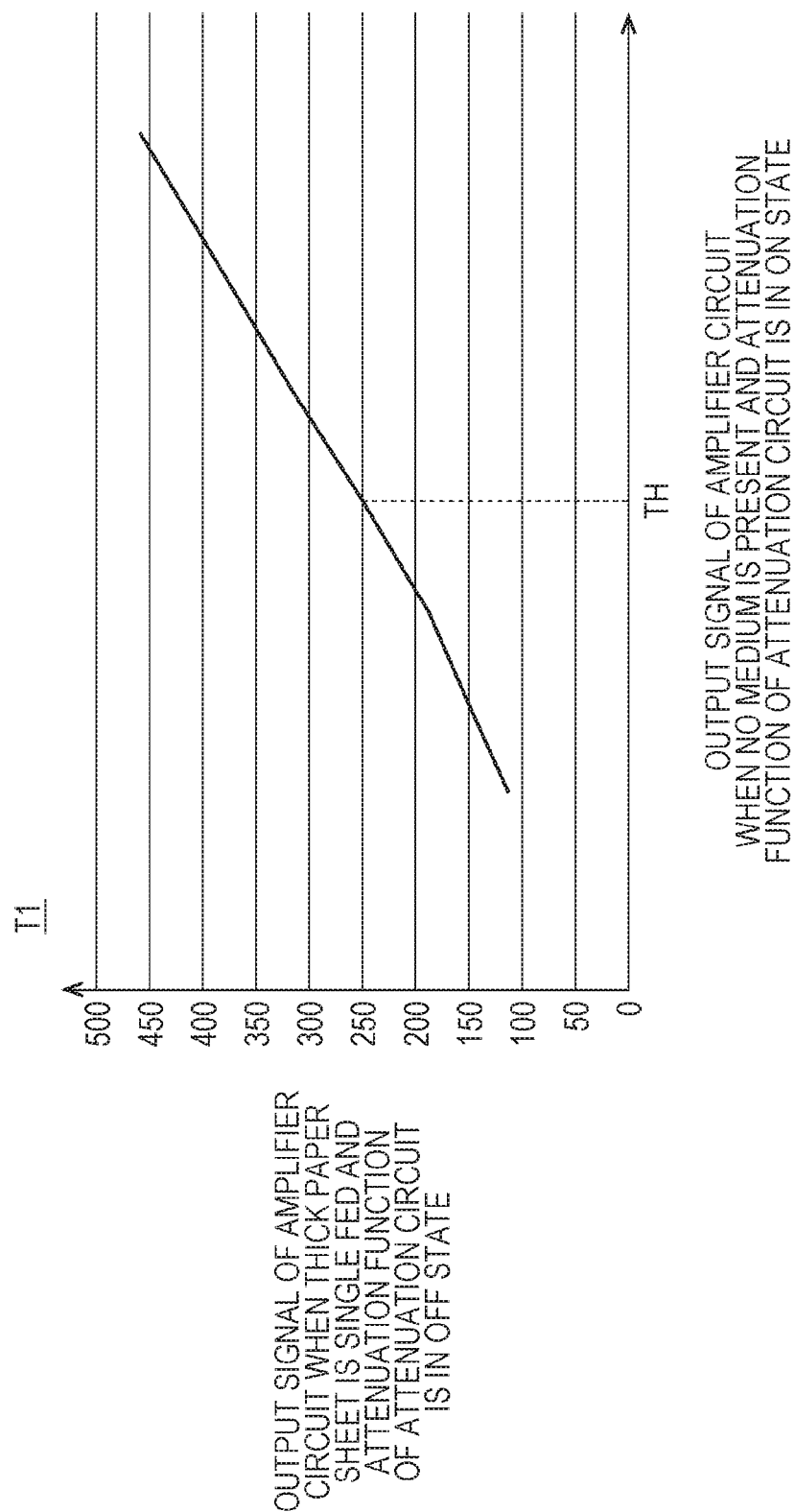
FIG. 2 is a graph showing correspondence relationship between an output signal of an amplifier circuit when no medium is present in a transport path and an attenuation function of an attenuation circuit is in the ON state, and an output signal of the amplifier circuit when a thick paper sheet is single fed and the attenuation function of the attenuation circuit is in the OFF state.

FIG. 2 shows, by a table T1, the correspondence relationship between an output signal of the amplifier circuit 60 when no medium is present in the transport path and the attenuation function of the attenuation circuit 65 is in the ON state, and an output signal of the amplifier circuit 60 when a predetermined thick paper sheet as a medium (hereinafter referred to as a thick paper sheet) is single fed through a transport path and the attenuation function of the attenuation circuit 65 is in the OFF state. However, the output signal of the amplifier circuit 60 on the horizontal axis and the vertical axis of FIG. 2 is a digital value converted by the A/D converter 67 and is a value input to the controller 20. Hereinafter, the digital value input from the A/D converter 67 to the controller 20 is simply referred to as a digital value. The digital value is, for example, a value obtained by representing a voltage range of 0 V to 3.3 V in a gradation range of 0 to 1024.

As the drive circuit 71 gradually changes the drive signal output to the speaker 51, the output signal of the amplifier circuit 60 also changes. Therefore, the table T1 can be obtained by recording the change in digital value by changing the drive signal in each of when no medium is present in the transport path and the attenuation function of the attenuation circuit 65 is in the ON state, and when the thick paper sheet is single fed and the attenuation function of the attenuation circuit 65 is in the OFF state. There is almost a proportional relationship between the output signal of the amplifier circuit 60 when no medium is present in the transport path and the attenuation function of the attenuation circuit 65 is in the ON state and the output signal of the amplifier circuit 60 when the thick paper sheet is single fed and the attenuation function of the attenuation circuit 65 is in the OFF state. The controller 20 has the table T1 as information in advance.

Figure 3:
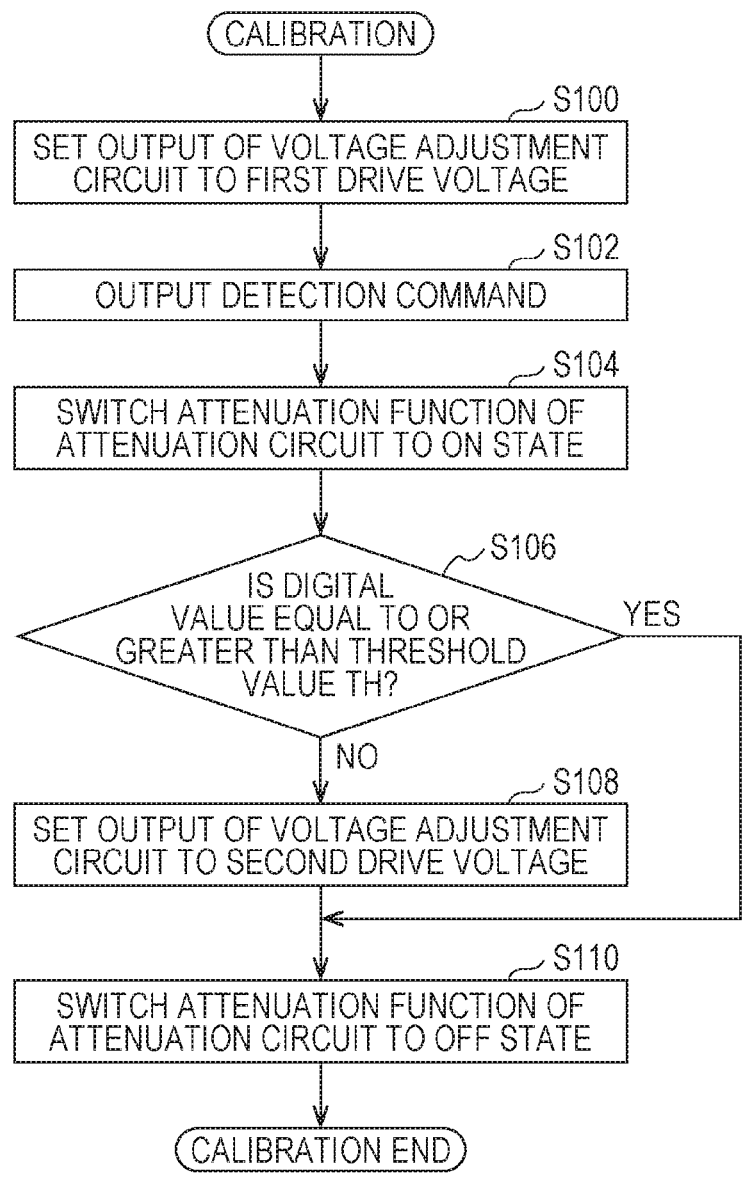
FIG. 3 is a flowchart showing a calibration procedure.

FIG. 3 is a flowchart showing a calibration procedure performed by the controller 20. In step S100, the controller 20 issues an instruction to set the output of the voltage adjustment circuit 72 to the first drive voltage. Upon receiving the instruction from the controller 20, the voltage adjustment circuit 72 outputs the first drive voltage to the drive circuit 71. Next, in step S102, the controller 20 outputs a detection command. With this detection command, the drive circuit 71 drives the speaker 51 to generate the ultrasonic wave, and the amplifier circuit 60 amplifies the output signal output by the mike 52 based on the ultrasonic wave input to the mike 52 after passing through the transport path where no medium is present and output the amplified output signal.

When the controller 20 outputs the detection command, the controller 20 transmits a switch control signal to the switch 66 via the control signal line SL1 in step S104. As a result, the switch 66 is turned on to set the attenuation function of the attenuation circuit 65 in the ON state. The execution timing of step S104 may be substantially the same as that of step S102. As a result, the output signal of the mike 52 is attenuated by the attenuation circuit 65, amplified by the amplifier circuit 60, and output. The output signal of the amplifier circuit 60 is converted by the A/D converter 67 and input to the controller 20 as a digital value.

In step S106, the controller 20 determines whether the digital value is equal to or greater than a predetermined threshold value TH for calibration. Referring to the table T1 in FIG. 2, the digital value when no medium is present in the transport path and the attenuation function of the attenuation circuit 65 is in the ON state is the threshold value TH. Assuming that the voltage adjustment circuit 72 maintains the current drive voltage, the digital value is about 250 when the thick paper sheet is single fed and the attenuation function of the attenuation circuit 65 is in the OFF state.

Figure 4:
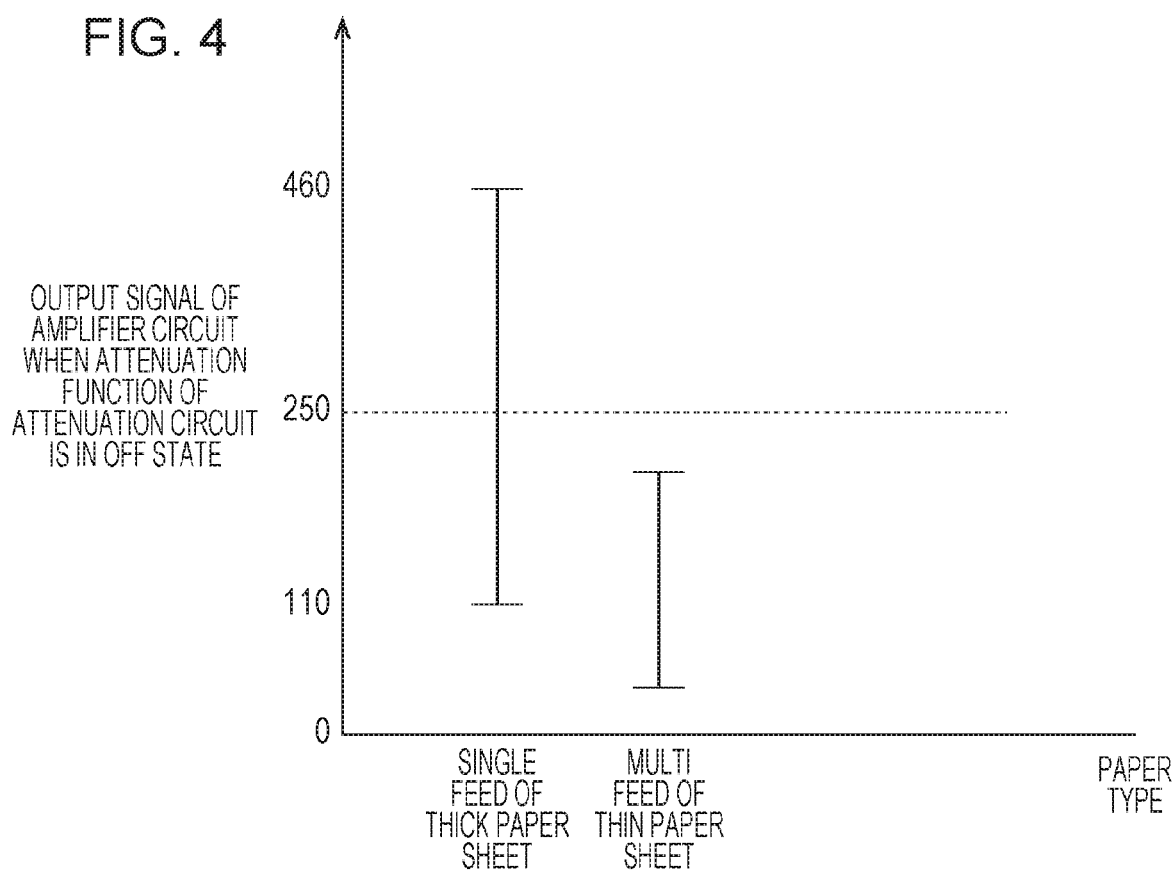
FIG. 4 is a graph showing an output signal of the amplifier circuit when the thick paper sheet is single fed and the attenuation function of the attenuation circuit is in the OFF state, and an output signal of the amplifier circuit when thin paper sheets are multi fed and the attenuation function of the attenuation circuit is in the OFF state in a state where calibration has not been performed.

FIG. 4 shows, in a state where calibration is not properly performed, an output signal of the amplifier circuit 60 obtained when the thick paper sheet is single fed and the attenuation function of the attenuation circuit 65 is in the OFF state, and an output signal of the amplifier circuit 60 obtained when two overlapped sheets of predetermined thin paper (hereinafter, thin paper sheet) are multi fed and the attenuation function of the attenuation circuit 65 is in the OFF state. The output signal on the vertical axis in FIG. 4 is a digital value as in FIG. 2. According to FIG. 4, in a state where the calibration has not been performed, the digital value when the thick paper sheet is single fed and the attenuation function of the attenuation circuit 65 is in the OFF state is generally in the range of 110 to 460. In addition, the digital value when thin paper sheets are multi fed and the attenuation function of the attenuation circuit 65 is in the OFF state is approximately in the range of 50 to 240. Such fluctuations correspond to a change in the output of the mike 52. When the output of the speaker 51 is increased, the value of the lower limit gradually increases, and the range in each case narrows although the value of the upper limit of the range does not substantially change in the case of single feed of the thick paper sheet and in the case of multi feed of the thin paper sheets. In a state where the calibration is not performed as shown in FIG. 4, the lower limit of the range at the time of single feed of the thick paper sheet is smaller than the upper limit of the range at the time of multi feed of the thin paper sheets. When a threshold value is set in the range where the respective ranges overlap, the multi feed detection process cannot be performed properly.

Here, the upper limit of the digital value obtained when the thin paper sheets are multi fed and the attenuation function of the attenuation circuit 65 is in the OFF state is about 240. Therefore, 250 is used as the threshold value for the multi feed detection process, and when setting is made so that it is determined that multi feed has occurred when the digital value is below the threshold value, multi feed can be detected. However, in order to avoid to erroneously detect that the multi feed is performed even though the single feed is actually performed, it is necessary to perform calibration so that the digital value when the attenuation function is in the OFF state and the thick paper sheet is single fed is equal to or greater than the threshold value of the multi feed detection process. As shown in FIG. 2, the digital value of about 250 when the thick paper sheet is single fed and the attenuation function of the attenuation circuit 65 is in the OFF state corresponds to a digital value, which is equal to the threshold value TH, when no medium is present in the transport path and the attenuation function of the attenuation circuit 65 is in the ON state. Therefore, the threshold value TH is an appropriate threshold value for calibration.

In step S106, when the digital value is equal to or greater than the threshold value TH, it can be said that the digital value when the thick paper sheet is single fed and the attenuation function of the attenuation circuit 65 is in the OFF state is 250 or more, which is the threshold value for the multi feed detection process. In this situation, since it is possible to distinguish between single feed of the thick paper sheet and multi feed of the thin paper sheets, the controller 20 skips step S108 by the determination of "YES" in step S106, and advances the process to step S110. In step S110, the controller 20 stops transmission of the switch control signal to the switch 66 through the control signal line SL1. As a result, the switch 66 is switched off to turn off the attenuation function of the attenuation circuit 65. After executing step S110, the controller 20 ends the calibration flowchart of FIG. 3.

On the other hand, in step S106, when the digital value is less than the threshold value TH, there is a possibility that the digital value when the thick paper sheet is single fed and the attenuation function of the attenuation circuit 65 is in the OFF state is less than 250 which is the threshold value for the multi feed detection process. In this case, there is a possibility of the erroneous detection that the multi feed is performed even although the thick paper sheet is actually single fed. Therefore, in step S106, when the digital value is less than the threshold value TH, the controller 20 advances the process to step S108 by the determination of "NO" in step S106.

In step S108, the controller 20 increases the output of the speaker 51 so that the digital value is equal to or greater than the threshold value TH when there is no obstacle (medium) between the speaker 51 and the mike 52 and the attenuation function of the attenuation circuit 65 is in the ON state. In other words, since the drive signal currently input to the speaker 51 by the drive circuit 71 is weak, adjustment is performed to increase the drive signal. Specifically, the controller 20 issues an instruction to set the output of the voltage adjustment circuit 72 to the second drive voltage. Upon receiving such an instruction from the controller 20, the voltage adjustment circuit 72 outputs the second drive voltage to the drive circuit 71. As described above, the first drive voltage is smaller than the second drive voltage. In this way, the controller 20 causes the switch 66 to switch the attenuation factor of the attenuation circuit 65 to the first attenuation factor in a state where no medium is present between the speaker 51 and the mike 52 to adjust the drive signal of the drive circuit 71 to the speaker 51 based on the output signal of the amplifier circuit 60. After executing step S108, the controller 20 advances the process to step S110.

Figure 5:
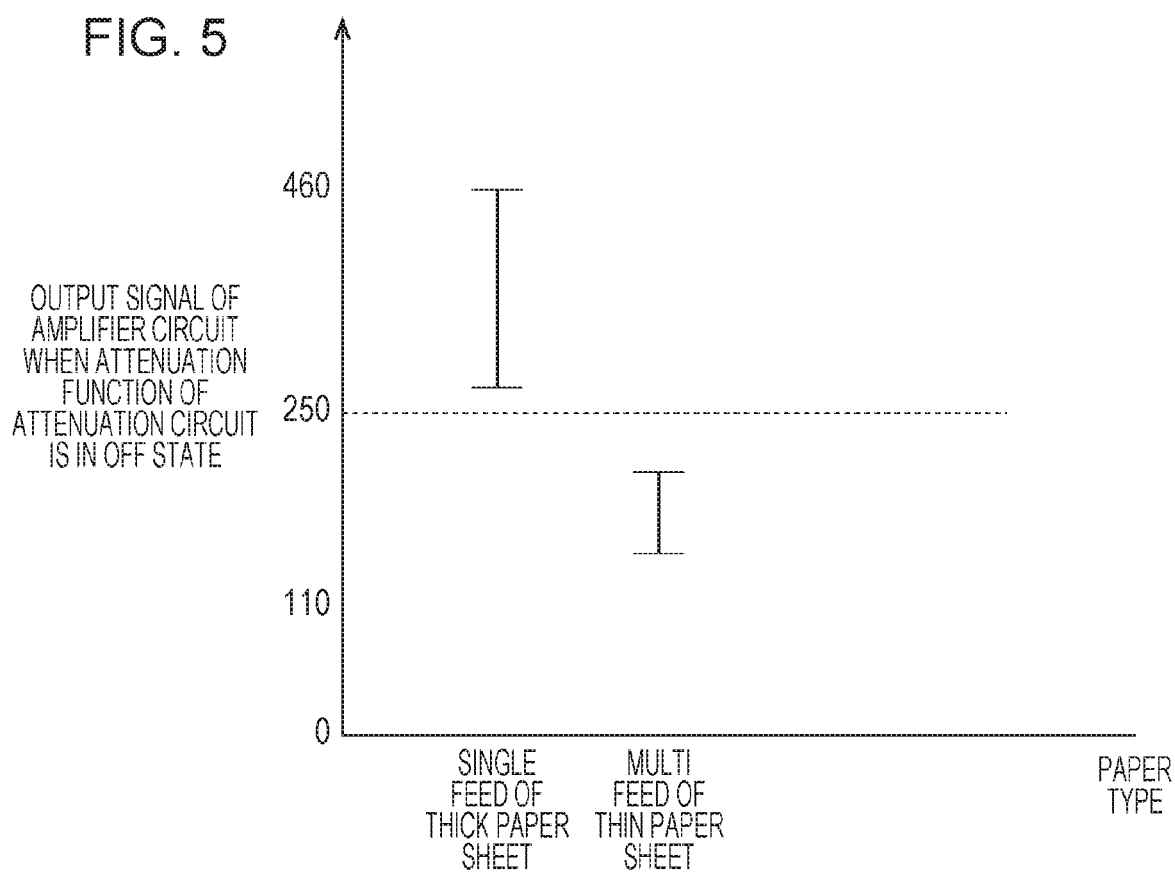
FIG. 5 is a graph showing an output signal of the amplifier circuit when the thick paper sheet is single fed and the attenuation function of the attenuation circuit is in the OFF state, and an output signal of the amplifier circuit when the thin paper sheets are multi fed and the attenuation function of the attenuation circuit is in the OFF state in a state where calibration has been performed.

FIG. 5 shows, in a state where calibration of FIG. 3 is performed, an output signal of the amplifier circuit 60 obtained when the thick paper sheet is single fed and the attenuation function of the attenuation circuit 65 is in the OFF state, and an output signal of the amplifier circuit 60 obtained when the two thin paper sheets are multi fed and the attenuation function of the attenuation circuit 65 is in the OFF state. The way of understanding FIG. 5 is the same as the way of understanding FIG. 4. As shown in FIG. 5, after the calibration is performed, the digital value when the thick paper sheet is single fed and the attenuation function of the attenuation circuit 65 is in the OFF state is approximately in the range of 260 to 460, and the digital value when the thin paper sheets are multi fed and the attenuation function of the attenuation circuit 65 is in the OFF state is in the range of approximately 130 to 240. That is, since the lower limit of the range at the time of single feed of the thick paper exceeds the upper limit of the range at the time of multi feed of the thin paper sheets, single feed and multi feed can be accurately distinguished by setting 250 as a threshold value between these ranges and performing the multi feed detection process.

The controller 20 does not perform the determination of step S106 again after the controller 20 instructs the voltage adjustment circuit 72 to output the second drive voltage in step S108. This is because when the output of the voltage adjustment circuit 72 is set to one of the predetermined first drive voltage and the predetermined second drive voltage, it is verified in calibration in advance that the digital value is a value having necessary order of magnitude, that is, a value equal to or greater than the threshold value TH, in a state where the attenuation function of the attenuation circuit 65 is in the ON state.

After performing the calibration, the controller 20 determines the state between the mike 52 and the speaker 51 based on the digital value in a state where the attenuation function of the attenuation circuit 65 is in the OFF state. That is, the controller 20 performs the multi feed detection process in accordance with the transport of the medium by the transport mechanism 30. In addition, after performing the calibration, the controller 20 may not only perform the multi feed detection process but also determine the type of a medium being transported, or perform another determination based on the digital value.

3. Modification of Calibration

In the embodiment described above, when a drive voltage supplied from the voltage adjustment circuit 72 to the drive circuit 71 is the first drive voltage or the second drive voltage, as a result, it is possible to avoid an error in the multi feed detection process due to the output fluctuation of the mike 52. However, further adjustment of the drive voltage may be necessary depending on the range in which the output of the mike 52 varies under the influence of the environment.

Figure 6:
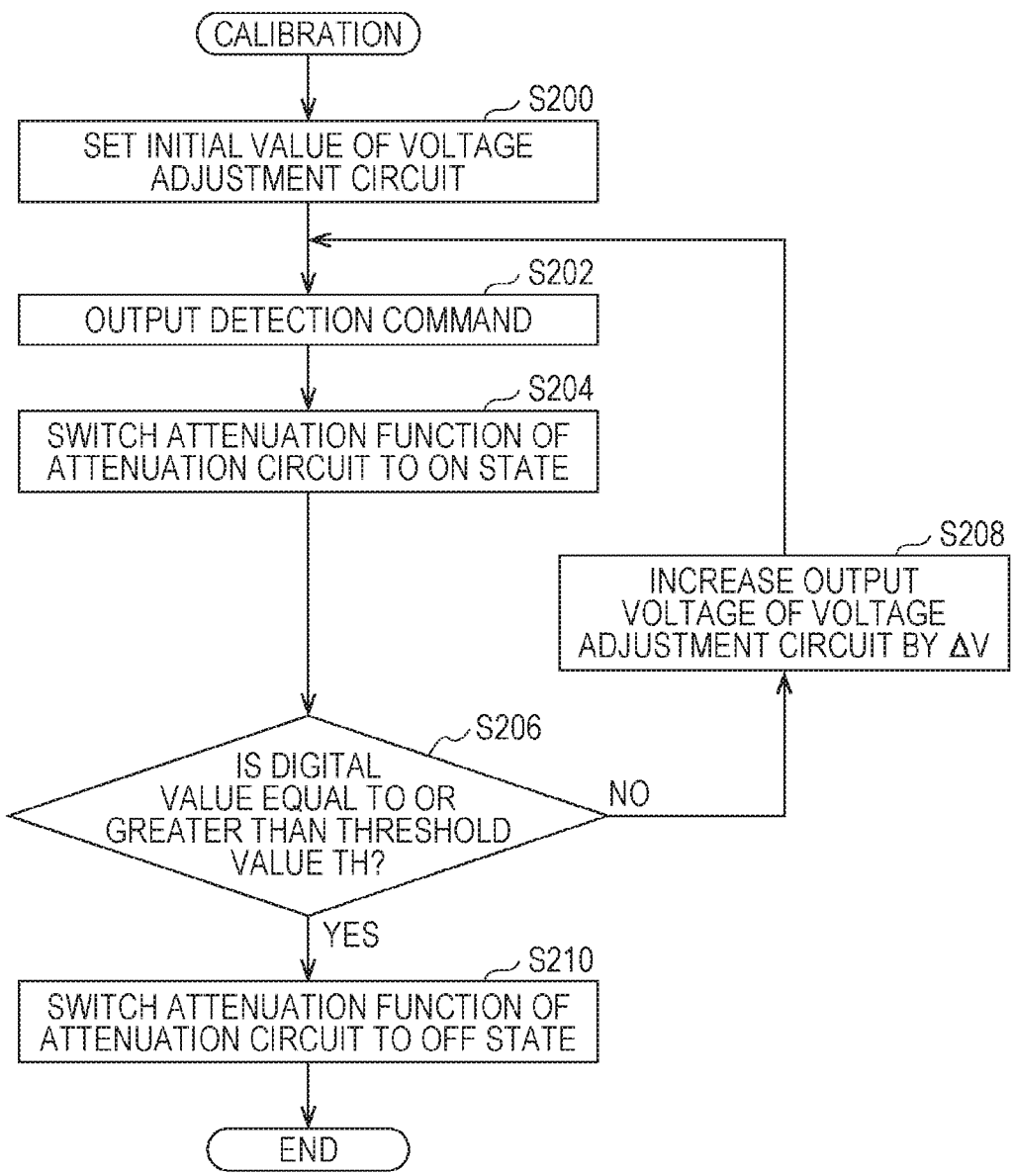
FIG. 6 is a flowchart showing a calibration procedure according to a modification.

FIG. 6 is a flowchart showing a calibration procedure performed by the controller 20 according to a modification. Differences between FIG. 6 and FIG. 3 will be mainly described. In step S200, the controller 20 sets the output of the voltage adjustment circuit 72 to an initial value. For example, as described above, the output of the voltage adjustment circuit 72 may be set to the first drive voltage. Steps S202, S204, and S206 are the same processes as steps S102, S104, and S106, respectively.

In step S206, when the digital value is equal to or greater than the threshold value TH, the controller 20 advances the process to step S210 by the determination of "YES". Step S210 is the same process as step S110. On the other hand, when the digital value is less than the threshold value TH, the controller 20 advances the process to step S208 by the determination of "NO" in step S206.

In step S208, the controller 20 increases the drive voltage output by the voltage adjustment circuit 72 to the drive circuit 71 by a predetermined voltage ΔV. Although depending on the output resolution of the voltage adjustment circuit 72, the voltage ΔV may be 2 V as an example. Then, returning to step S202, the processes are repeated. In the loop processing of steps S202 to S208, the drive voltage output by the voltage adjustment circuit 72 to the drive circuit 71 is increased in steps of the voltage ΔV until the digital value is equal to or greater than the threshold value TH in a state where the attenuation function of the attenuation circuit 65 is in the ON state. The controller 20 can accurately perform the multi feed detection process regardless of the output fluctuation of the mike 52 due to the influence of the environment and the like by performing the calibration according to the embodiment or the modification.

4. Summary

According to the present embodiment, the transport apparatus includes the transport mechanism 30 for transporting a medium along a predetermined transport path, the speaker 51 and the mike 52 disposed at respective positions between which the transport path is interposed, where the speaker 51 and the mike 52 face each other, the drive circuit 71 that outputs a drive signal to the speaker 51, the amplifier circuit 60 formed by coupling a plurality of amplifiers in series, where the amplifier circuit 60 amplifies and outputs an output signal of the mike 52, and the processor (the controller 20) to which the output signal of the amplifier circuit 60 is input. Further, the transport apparatus includes the attenuation circuit 65 disposed in a stage preceding a predetermined amplifier of the plurality of amplifiers, where the attenuation circuit attenuates an input signal to output the attenuated input signal to the predetermined amplifier, and the switch 66 that switches an attenuation factor by the attenuation circuit 65. The processor causes the switch 66 to switch an attenuation factor by the attenuation circuit 65 to a first attenuation factor among the first attenuation factor and a second attenuation factor having a lower attenuation degree than the first attenuation factor in a state where the medium is not present between the speaker 51 and the mike 52 to adjust a drive signal of the drive circuit 71 to the speaker 51 based on the output signal of the amplifier circuit 60, and after adjusting the drive signal, causes the switch 66 to switch an attenuation factor by the attenuation circuit 65 to the second attenuation factor to determine a state between the mike 52 and the speaker 51 based on the output signal of the amplifier circuit 60.

According to the configuration, the processor causes the switch 66 to switch the attenuation factor by the attenuation circuit 65 to the first attenuation factor in a state where no medium is present between the speaker 51 and the mike 52 to set the attenuation function of the attenuation circuit 65 in the ON state, so that it is possible to obtain an output signal that is not saturated, that is, an output signal suitable for the adjustment as calibration, from the amplifier circuit 60. In the related art, the circuit configuration has been complicated in which, for example, an output line for obtaining an output signal, of a ultrasonic sensor, that is dedicated to calibration, and which is not saturated is a path different from the output line to the processor of the amplifier circuit that amplifies the output signal of the ultrasonic sensor, and separately formed for the amplifier circuit. In the present embodiment, with the configuration in which the switch 66 switches the attenuation circuit 65, the processor only needs to receive the signal output from the last stage of the amplifier circuit 60 at the time of the calibration or at the time of the multi feed detection process during the medium transport. Therefore, the hardware configuration is simplified, and it is possible to suppress an increase in the cost of the product and an increase in the man-hour in manufacturing the product.

According to the present embodiment, the predetermined amplifier is a first stage amplifier among the plurality of amplifiers. According to the example of FIG. 1, the first stage amplifier in the amplifier circuit 60 is the first amplifier 61, and the attenuation circuit 65 is disposed in a stage preceding the first amplifier 61. According to the configuration, the processor causes the switch 66 to switch the attenuation factor of the attenuation circuit 65 to the first attenuation factor in a state where no medium is present between the speaker 51 and the mike 52 to attenuate the output signal from the mike 52 before being amplified by the amplifier circuit 60, so that it is possible to obtain an output signal suitable for calibration from the amplifier circuit 60. In addition, since the attenuation circuit 65 may be inserted between the mike 52 and the first amplifier 61, the process of adding the attenuation circuit 65 and the switch 66 to the amplifier circuit 60 is facilitated.

However, the predetermined amplifier may be an amplifier other than the first stage amplifier. For example, the attenuation circuit 65 may be disposed in a stage preceding the filter 62 or may be disposed in a stage preceding the second amplifier 63.

5. Other Explanations

Some aspects included in the present embodiment will be further described. The transport apparatus may include a filter circuit 80 for removing a noise component in the control signal line SL1 for transmitting, from the processor to the switch 66, a switch control signal for controlling a switchover of the switch 66.

Figure 7:
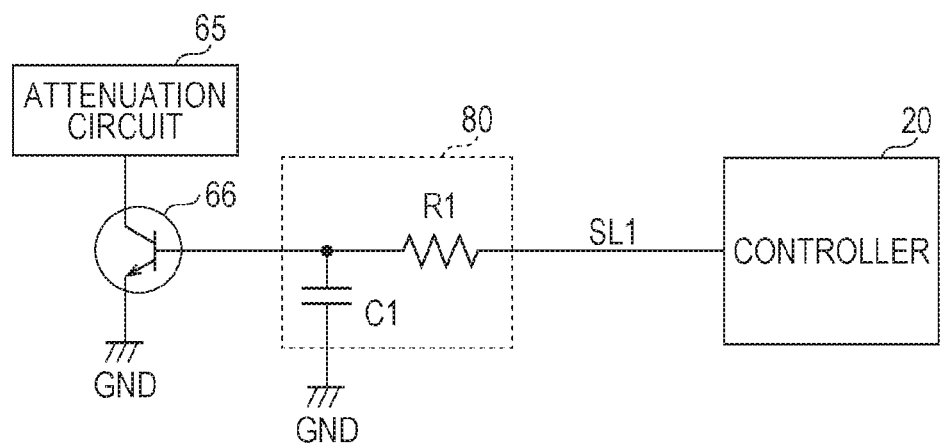
FIG. 7 is a diagram schematically showing a filter circuit provided in a control signal line.

FIG. 7 schematically shows the filter circuit 80 provided in the control signal line SL1 between the controller 20 and the switch 66. In FIG. 7, as an example, the switch 66 is an NPN-type bipolar transistor. The switch 66 is turned on when a switch control signal is input from the controller 20 to the base of the transistor via the control signal line SL1. The filter circuit 80 is an RC filter including for example, a resistor R1 provided in the middle of the control signal line SL1, and a capacitor C1 provided between an end near the switch 66 of both ends of the resistor R1 and the ground.

The switch control signal transmitted from the controller 20 to the switch 66 may include, for example, noise components of several hundred kHz, and some of such noise components can enter the amplifier circuit 60 via the switch 66 and the attenuation circuit 65. The noise component entering the amplifier circuit 60 is amplified and appears as part of the output signal of the amplifier circuit 60. The filter circuit 80 improves the SN ratio of the output signal of the amplifier circuit 60 by removing or attenuating the noise component included in the switch control signal. The filter circuit 80 may be constituted by a plurality of continuously coupled RC filters, or may be constituted by an LC filter combining an inductor and a capacitor.

The second amplifier 63, which is the last stage amplifier among the plurality of amplifiers constituting the amplifier circuit 60, is a subtraction circuit that amplifies and outputs a difference between an input signal and a predetermined potential. Specifically, the second amplifier 63 amplifies a difference between an output signal from the filter 62 and from a potential of half of 3.3 V as a power supply voltage supplied from a power supply circuit (not shown) to output the amplified difference to the peak hold circuit 64. The peak hold circuit 64 is a kind of rectifier circuit that converts an alternating current output from the subtraction circuit into a direct current. The amplifier circuit in the related art includes a capacitor to cut the DC component between the last stage amplifier and the rectifier circuit, but in the present embodiment, as one of the features, such a DC component cutting capacitor is not mounted between the second amplifier 63, which is a subtraction circuit, and the peak hold circuit 64. The delay of the output signal by the capacitor can be eliminated by not mounting the DC component cutting capacitor between the second amplifier 63, which is a subtraction circuit, and the peak hold circuit 64.

3.3 V as a power supply voltage is supplied to each drive unit of the amplifier circuit 60 such as the first amplifier 61, the filter 62, the second amplifier 63, and the peak hold circuit 64 from the above power supply circuit. A filter circuit for noise removal, such as an LC filter, may also be mounted on a supply line of a power supply voltage from such a power supply circuit. It is possible to suppress the effect of noise components included in the power supply voltage, and improve the S/N ratio of the output signal of the amplifier circuit 60 by mounting the filter circuit for noise removal on the supply line of the power supply voltage from the power supply circuit.

What is claimed is:

1. A transport apparatus comprising:
    a transport mechanism for transporting a medium along a predetermined transport path;
    a speaker and a mike disposed at respective positions between which the transport path is interposed, the speaker and the mike facing each other;
    a drive circuit that outputs a drive signal to the speaker;
    an amplifier circuit formed by coupling a plurality of amplifiers in series, the amplifier circuit amplifying and outputting an output signal of the mike;
    a processor to which the output signal of the amplifier circuit is input;
    an attenuation circuit disposed in a stage preceding a predetermined amplifier of the plurality of amplifiers, the attenuation circuit attenuating an input signal to output the attenuated input signal to the predetermined amplifier; and
    a switch that switches an attenuation factor by the attenuation circuit, wherein the processor causes the switch to switch the attenuation factor by the attenuation circuit to a first attenuation factor among the first attenuation factor and a second attenuation factor having a lower attenuation degree than the first attenuation factor in a state where the medium is not present between the speaker and the mike based on the output signal of the amplifier circuit,
    causes a voltage adjustment circuit to adjust a drive signal of the drive circuit, and
    after adjusting the drive signal, causes the switch to switch the attenuation factor by the attenuation circuit to the second attenuation factor to determine a state between the mike and the speaker based on the output signal of the amplifier circuit.

2. The transport apparatus according to claim 1, wherein the predetermined amplifier is a first stage amplifier among the plurality of amplifiers.

3. The transport apparatus according to claim 1, further comprising a filter circuit for removing a noise component in a control signal line for transmitting, from the processor to the switch, a switch control signal for controlling a switchover of the switch.

4. The transport apparatus according to claim 1, wherein
    a last stage amplifier among the plurality of amplifiers is a subtraction circuit for amplifying and outputting a difference between an input signal and a predetermined potential, and wherein
    the transport apparatus includes a peak hold circuit between the subtraction circuit and the processor.

* * * * *